(12) United States Patent
Schroder et al.

(10) Patent No.: US 10,318,449 B2
(45) Date of Patent: Jun. 11, 2019

(54) SYSTEM AND METHOD FOR MEMORY ACCESS TOKEN REASSIGNMENT

(71) Applicant: Marvell World Trade Ltd., St. Michael (BB)

(72) Inventors: Jacob Jul Schroder, Lyngby (DK); Nicolai Asbjorn Smitt, København (DK)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/835,200

(22) Filed: Dec. 7, 2017

(65) Prior Publication Data

US 2018/0157606 A1 Jun. 7, 2018

Related U.S. Application Data

(60) Provisional application No. 62/431,238, filed on Dec. 7, 2016.

(51) Int. Cl.
*G06F 13/16* (2006.01)
*G06F 12/14* (2006.01)
(Continued)

(52) U.S. Cl.
CPC ...... *G06F 13/1694* (2013.01); *G06F 12/0292* (2013.01); *G06F 12/109* (2013.01);
(Continued)

(58) Field of Classification Search
CPC .. H04L 49/90; H04L 49/9057; H04L 49/9068
See application file for complete search history.

(56) References Cited

U.S. PATENT DOCUMENTS 7,023,840 B2 * 4/2006 Golla .................... H04L 49/254
370/360
7,602,720 B2 * 10/2009 Bergamasco ........... H04L 47/10
370/235
(Continued)

FOREIGN PATENT DOCUMENTS

WO WO-99/07180 A2 2/1999

OTHER PUBLICATIONS

U.S. Appl. No. 14/515,363, Turgeman et al., "Methods and Network Device for Performing Cut-Through," filed Oct. 15, 2014.
(Continued)

*Primary Examiner* — Midys Rojas
*Assistant Examiner* — Khoa D Doan

(57) ABSTRACT

A network device is described. The network device includes a plurality of ingress interfaces, a plurality of memory units configured to store packets received at the plurality of ingress interfaces, a first pool of memory access tokens, and one or more integrated circuits that implement a memory controller. The memory access tokens correspond to respective memory units and are distinct within the first pool. The memory controller is configured to selectively assign at least one individual memory access token to the ingress interfaces to govern write access to the memory units. The ingress interfaces write packets to memory units identified by the corresponding assigned memory access tokens. The network controller is configured to reassign a first memory access token from a first ingress interface to a second ingress interface between consecutive write commands from the first ingress interface based on a write access scheme to access non-sequential memory units.

20 Claims, 6 Drawing Sheets

(51) Int. Cl.
*H04L 12/861* (2013.01)
*G06F 12/02* (2006.01)
*G06F 12/109* (2016.01)

(52) U.S. Cl.
CPC ...... *G06F 12/1433* (2013.01); *G06F 13/1626* (2013.01); *G06F 13/1673* (2013.01); *H04L 49/90* (2013.01); *G06F 2212/1052* (2013.01)

(56) References Cited

U.S. PATENT DOCUMENTS

| | | | | |
|---|---|---|---|---|
| 7,756,991 | B2* | 7/2010 | Chen | H04L 29/06 |
| | | | | 709/226 |
| 7,765,328 | B2 | 7/2010 | Bryers et al. | |
| 7,924,860 | B1 | 4/2011 | Frailong et al. | |
| 8,111,690 | B2 | 2/2012 | Hussain et al. | |
| 8,422,508 | B2* | 4/2013 | Beshai | H04L 49/15 |
| | | | | 370/422 |
| 8,725,873 | B1* | 5/2014 | Bromberg | H04L 67/1017 |
| | | | | 709/225 |
| 9,118,576 | B2 | 8/2015 | Roitshtein | |
| 9,306,876 | B1* | 4/2016 | Ulman | H04L 49/90 |
| 9,455,907 | B1 | 9/2016 | Shumsky et al. | |
| 9,467,399 | B2 | 10/2016 | Wohlgemuth et al. | |
| 9,479,620 | B2 | 10/2016 | Levy et al. | |
| 9,942,169 | B1* | 4/2018 | Detwiler | H04L 49/25 |
| 10,146,710 | B1* | 12/2018 | Zemach | G06F 13/1642 |
| 2004/0003173 | A1* | 1/2004 | Yao | G06F 3/061 |
| | | | | 711/114 |
| 2006/0294331 | A1* | 12/2006 | Forrer, Jr. | G06F 12/1466 |
| | | | | 711/163 |
| 2007/0121499 | A1 | 5/2007 | Pal et al. | |
| 2014/0169378 | A1* | 6/2014 | Shumsky | H04L 49/552 |
| | | | | 370/394 |
| 2014/0177470 | A1 | 6/2014 | Roitshtein et al. | |
| 2014/0192815 | A1 | 7/2014 | Shumsky et al. | |
| 2015/0071079 | A1 | 3/2015 | Kadosh et al. | |
| 2015/0378737 | A1 | 12/2015 | Debbage et al. | |
| 2017/0195259 | A1* | 7/2017 | Florea | G06F 12/10 |

OTHER PUBLICATIONS

Shpiner et al., "Reducing the Reordering Delay in Multi-Core Network Processors," Technical Report TR12-01, Comnet, Technion, Israel, undated (12 pages).

International Search Report and Written Opinion in International Patent Application No. PCT/IB2017/001779, dated Jul. 24, 2018 (13 pages).

* cited by examiner

SYSTEM AND METHOD FOR MEMORY ACCESS TOKEN REASSIGNMENT

CROSS-REFERENCES TO RELATED APPLICATIONS

This disclosure claims the benefit of U.S. Provisional Patent Application No. 62/431,238, entitled "Writing to a Packet Buffer Without Memory Collisions" and filed on Dec. 7, 2016, the disclosure of which is incorporated herein by reference in its entirety.

FIELD OF THE DISCLOSURE

The present disclosure relates generally to communication systems and, more particularly, to using memory access tokens to store received data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some network switches store portions of incoming packets in a centralized packet buffer, for example, while egress interfaces for the packets are identified and other processing operations are performed by a packet processor. Packets are later transferred from the centralized packet buffer towards an identified egress interface. In some configurations, the centralized packet buffer is made up of many memory units that are individually addressable, which allows for simultaneous writes to the packet buffer. For example, multiple ingress interfaces can simultaneously write to separate memory units of the centralized packet buffer.

SUMMARY

In an embodiment, a network device includes a plurality of ingress interfaces, a plurality of memory units configured to store packets received at the plurality of ingress interfaces while data corresponding to the packets is processed by a packet processor at least to determine an egress interface of the network device through which to transmit the packets, a first pool of memory access tokens, and one or more integrated circuits that implement a memory controller. Ones of the first pool of memory access tokens corresponding to respective memory units of the plurality of memory units and ones of the access tokens being distinct within the first pool. The one or more integrated circuits are configured to selectively assign individual memory access tokens of the first pool to ones of the plurality of ingress interfaces to govern write access to the plurality of memory units. Ingress interfaces among the plurality of ingress interfaces are respectively assigned at least one memory access token and write packets to memory units of the plurality of memory units identified by the corresponding assigned one or more memory access tokens. The one or more integrated circuits are configured to reassign a first memory access token of the first pool from a first ingress interface of the plurality of ingress interfaces to a second ingress interface of the plurality of ingress interfaces between consecutive write commands from the first ingress interface based on a write access scheme to access non-sequential memory units.

In another embodiment, a method for storing packets, received at a plurality of ingress interfaces of a network device while data corresponding to the packets is processed by a packet processor at least to determine an egress interface of the network device through which to transmit the packets, includes selectively assigning, by a memory controller of the network device, individual memory access tokens of a first pool of memory access tokens to ones of the plurality of ingress interfaces to govern write access to the plurality of memory units. Ingress interfaces among the plurality of ingress interfaces are respectively assigned at least one memory access token and write packets to memory units of the plurality of memory units identified by the corresponding assigned one or more memory access tokens. The method also includes: receiving a packet at a first ingress interface of the plurality of ingress interfaces; and determining a memory address of a reserved memory unit of the plurality of memory units at which to store at least a portion of the packet. The reserved memory unit is identified by a memory access token assigned to the ingress interface. The method also includes storing the portion of the packet at the memory address of the reserved memory unit; and reassigning, by the memory controller, the memory access token to a different ingress interface of the plurality of ingress interfaces after the portion of the packet has been stored.

BRIEF DESCRIPTION OF THE DRAWINGS

FIG. 2 is a simplified block diagram of an example memory controller of the network device of FIG. 1, according to an embodiment.

DETAILED DESCRIPTION

In various embodiments described herein, a network device includes a packet buffer having multiple memory units that are individually addressable. Randomized (e.g., non-sequential) addresses for the packet buffer are generated for ingress interfaces of the network device to store received network packets, which provides improved performance when packets are subsequently read from the packet buffer. In an embodiment, the randomized address includes at least a non-sequential selection of a memory unit. In another embodiment, the randomized address includes the non-sequential selection of the memory unit and a non-sequential address within the selected memory unit. In an embodiment, two or more ingress interfaces identify respective randomized addresses and send corresponding write commands to the packet buffer to store respective packets. In one scenario, the write commands "collide" in that a first write command cannot be completed before a second write command is received because the corresponding addresses refer to the same memory unit. In this scenario, congestion of the write commands occurs and execution of the second write command is delayed until the first write command has completed. The delay in execution of the second write command, and possibly subsequent write commands to the same memory unit, is generally non-deterministic and negatively impacts performance of the network device. In an embodiment, write access to the memory units of the packet buffer is governed by a pool of memory access tokens, where ones of the pool of memory access tokens correspond to respective memory units of the packet buffer. A memory controller selectively assigns individual memory tokens to the ingress interfaces and reassigns the memory tokens to promote a randomized, such as a non-sequential, distribution of write commands to the packet buffer. In some embodiments, use of the memory tokens precludes the need for a first-in, first-out buffer space for delayed (e.g., congested) write commands. In some scenarios, use of the memory tokens reduces a read-before-write risk (i.e., where a read command for a packet is processed before the entire packet has been written to memory), by effectively "locking" the memory unit until the entire packet has been written to the memory unit.

Figure 1:
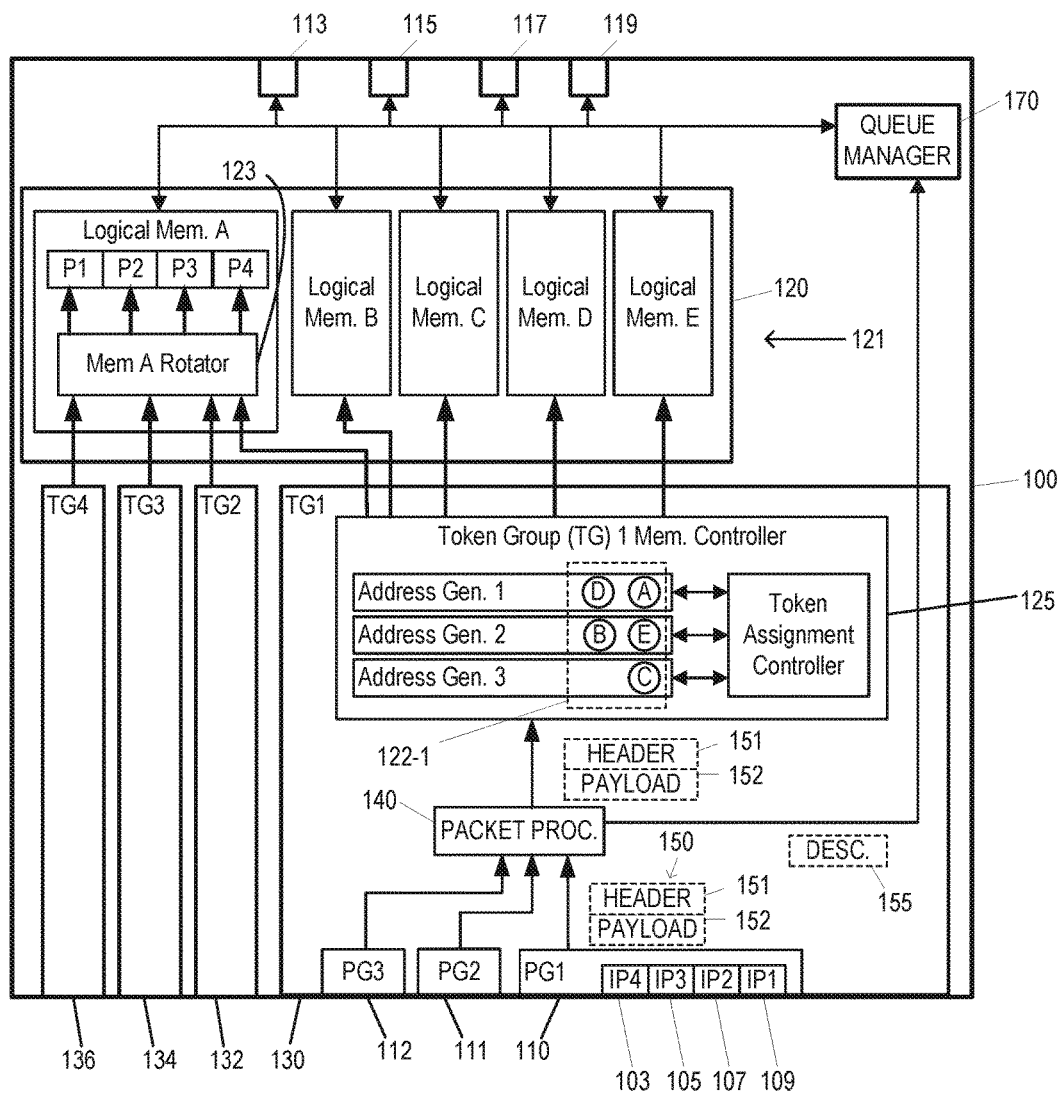

FIG. 1 is a simplified block diagram of an example network device 100 in which network packet storage techniques of the present disclosure are implemented, according to an embodiment. The network device 100 is a bridge, router, switch, or any other suitable network device configured to operate within a networked environment, in various embodiments. In the embodiment shown in FIG. 1, the network device 100 includes a plurality of port interfaces, including ports 103, 105, 107, 109, 113, 115, 117, and 119. In some embodiments, each of the plurality of ports is a bidirectional port that can act as either an ingress port to receive a network packet or an egress port to transmit a network packet. In other embodiments, ports are dedicated to be either ingress ports or egress ports. For instance, ports 103, 105, 107, and 109 are dedicated ingress ports and ports 113, 115, 117, and 119 are dedicated egress ports, in an embodiment.

While FIG. 1 shows only eight ports, in other embodiments network device 100 includes more than eight ports or less than eight ports. In various embodiments, network device 100 is configured to handle unicast, multicast and/or broadcast operations. FIG. 1 illustrates an embodiment in which network device 100 is capable of at least unicast operations, and a scenario in which a packet ingresses via port 103 and egresses via port 112 to a single destination, in a unicast manner. It is noted that, in other embodiments and/or scenarios, a packet may instead egress via one port (unicast), via two ports, via three or more ports, or via all ports of the switch.

Figure 4:
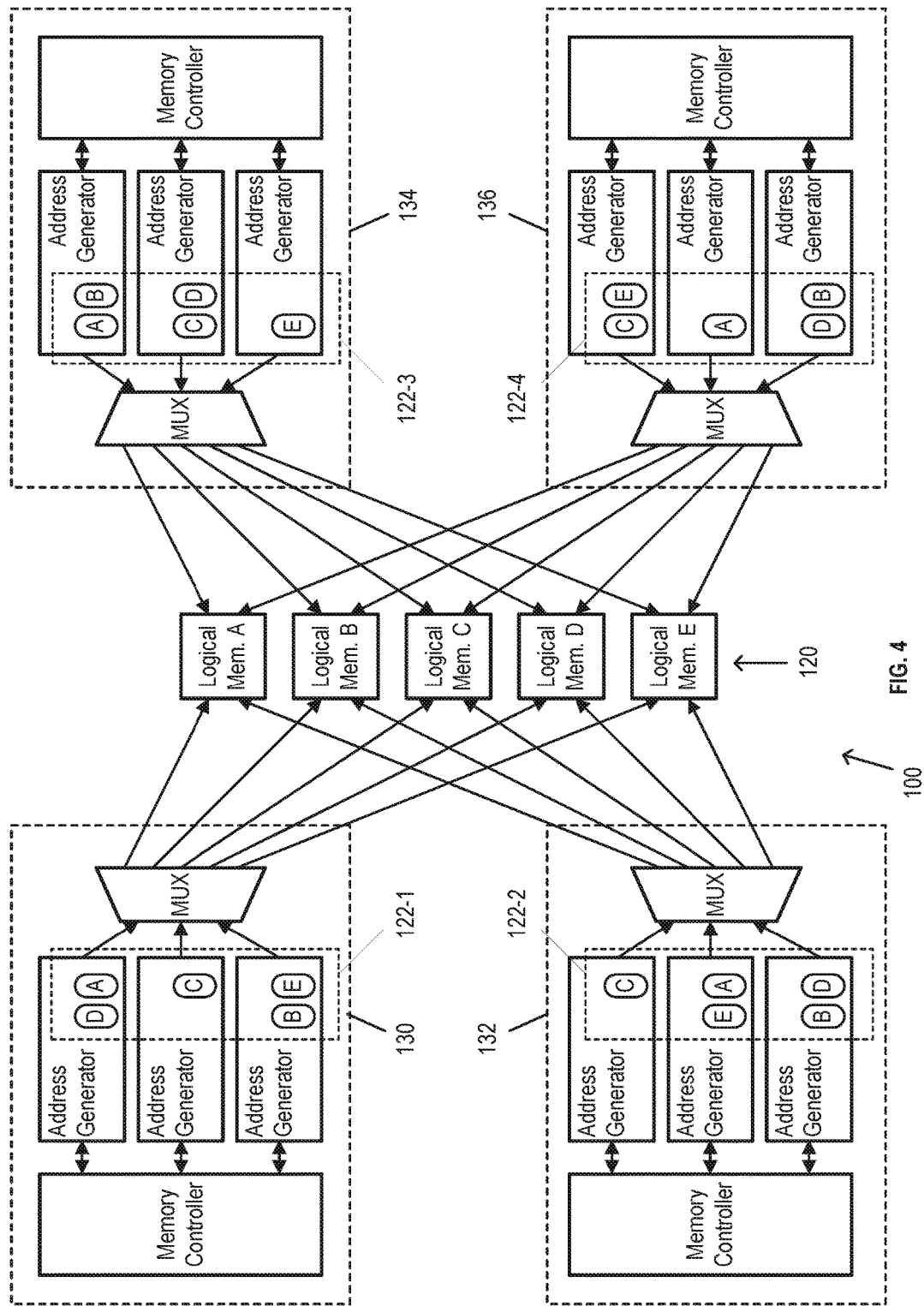
FIG. 4 is a simplified block diagram of the network device of FIG. 1, according to an embodiment.

The network device 100 includes a packet buffer 120 having a plurality of memory units 121, for example, memory units A, B, C, D, and E as shown in the embodiment of FIG. 1. The plurality of memory units 121 are configured to store packets (or portions thereof) received at the plurality of ingress ports, for example, while data corresponding to the packets is processed by one or more processors at least to determine an egress port of the network device 100 through which to transmit the packets. The network device 100 utilizes one or more pools 122 of memory access tokens to govern write access to the plurality of memory units 121, for example, pool 122-1 (FIG. 1) and pools 122-2, 122-3, and 122-4 (FIG. 4). In an embodiment, for example, each memory access token A, B, C, D, and E of a pool 122 corresponds to a respective memory unit A, B, C, D, and E and write commands are generated for storing a packet received from an ingress port at a particular memory unit only once the corresponding memory access token has been assigned to the ingress port (e.g., the ingress port is a "token holder"). In other words, a memory unit is reserved for holders of the memory access token. In an embodiment, ones of a pool 122 of memory access tokens correspond to respective memory units of the plurality of memory units 121 and are distinct within the pool 122 (e.g., the pool 122 contains only one memory access token per memory unit so that there are no duplicate tokens within the pool 122). In the embodiments shown in FIG. 1 and FIG. 4, each pool 122 includes respective memory access tokens A, B, C, D, and E.

A write command for writing a received packet to the plurality of memory units 121 includes at least a portion of the received packet and identifies i) a reserved memory unit to which the portion of the received packet is to be stored, and ii) a memory address of the reserved memory unit. The network device 100 utilizes randomized selection of the memory unit to improve performance when packets are subsequently read from the plurality of memory units 121, in an embodiment. The network device also utilizes memory access tokens to reduce the likelihood of a collision between write commands, in an embodiment. For example, where only one memory access token for a memory unit exists within a pool, assigning the memory access token to a particular interface or port of a token group precludes other members of the token group from attempting to write using the memory access token and thus to the same memory unit. In a further embodiment, the network device 100 reassigns the memory access tokens to further promote a random distribution of packets among the plurality of memory units 121, as described herein.

The plurality of memory units 121 includes suitable non-transitory memory devices such as a RAM, or any other suitable type of memory device, in various embodiments. The plurality of memory units 121 in some embodiments is a high-bandwidth shared packet memory. In some embodiments and/or scenarios, the plurality of memory units 121 is shared by the ports of the network device 100 for storing packets to be egressed according to a schedule or queue, for example, when a corresponding target egress port is congested. In one such scenario, a packet to be transmitted via an egress port is stored in a corresponding egress queue of the plurality of memory units 121 while another packet is transmitted by the egress port. In this scenario, the egress port is said to be "congested" when packet bandwidth targeting the egress port is greater than the bandwidth provided by the egress port. Thus, not all packets targeted for a given egress port necessarily will be transmitted immediately after they have been processed by the packet processor 140. In various embodiments, the plurality of memory units 121 facilitates one or more of complex scheduling, rate limiting, or assembly of packets.

In some embodiments, two or more ports of the network device 100 are grouped within one or more port groups. In the embodiment shown in FIG. 1, the network device 100 includes port groups 110, 111, and 112. Port group 110 includes ingress ports 103, 105, 107, and 109, and port groups 111 and 112 include additional ports (not shown). In various embodiments, the ports of a port group share one or more interfaces to a memory unit (e.g., memory units 121), memory controller (e.g., memory controller 125), or other suitable processor of the network device 100 (e.g., packet processor 140). In an embodiment, a port group is configured such that each port has one or more same port characteristics, for example, a same maximum transmission speed (e.g., 1 Gbps, 40 Gbps). As an example, each of the ports 103, 105, 107, and 109 of the port group 110 have a maximum transmission speed of 50 Gbps. In another embodiment, the port group is configured to have an aggregate group characteristic, for example, an aggregate maximum transmission speed. As an example, the ports 103, 105, 107, and 109 have maximum transmission speeds of 20 Gbps, 40 Gbps, 40 Gbps, and 100 Gbps, respectively, and the port group 110 has an aggregate transmission speed of 200 Gbps. In some embodiments, two or more ports or port groups share one or more ingress interfaces towards a memory unit, memory controller, or other suitable processor of the network device 100. In the embodiment shown in FIG. 1, for example, port groups 110, 111, and 112 share an ingress interface to packet processor 140. In another embodiment, the port groups 110, 111, and 112 share an ingress interface to memory controller 125.

In some embodiments, the network device 100 includes a plurality of token groups, for example, token groups 130, 132, 134, and 136 (FIG. 1 and FIG. 4). In other words, the plurality of ports and/or port groups is arranged in token groups. In an embodiment, a token group is a group of ports and/or port groups that share a pool 122 of memory access tokens that correspond to the plurality of memory units 121, in an embodiment. In the embodiment of FIG. 1 and FIG. 4, the network device 100 includes four token groups 130, 132, 134, and 136 and utilizes four respective pools 122 of memory access tokens that correspond to the memory units A, B, C, D, and E. In FIG. 1, only the pool 122-1 of the token group 130 is shown for clarity. In other embodiments, the network device 100 includes one, two, three, or more token groups.

The network device 100 includes at least one token group memory controller 125 for processing write commands for the token group 130. In an embodiment, the network device 100 includes a separate token group memory controller for each token group 130, 132, 134, and 136 (only the token group memory controller for token group 130 is seen). In another embodiment, two or more of the token groups 130, 132, 134, and 136 share a token group memory controller. The token group memory controller 125 is configured to assign individual memory access tokens from the corresponding pool 122 of memory access tokens to ones of the ports and/or port groups, in an embodiment. Moreover, the token group memory controller 125 is configured to reassign the memory access tokens to improve a random or non-sequential distribution of packets among the plurality of memory units 121, in an embodiment. For example, reassigning the memory access tokens prevents a port from monopolizing a same memory unit when storing a plurality of packets. In an embodiment, the token group memory controller 125 ensures that each ingress interface (e.g., port and/or port group) has at least one assigned memory access token to reduce delays for executing a write command for the ingress interface.

In some embodiments, each of the plurality of memory units 121 is a logical memory unit that comprises multiple physical memory units. The multiple physical memory units are, for example, separate memory chips that are individually and independently accessible, and the logical memory unit is accessed as a single memory unit, in an embodiment. In some embodiments, the physical memory units of the logical memory unit are addressed with a same address space so that each physical memory unit stores a word of a multi-word cell. In an embodiment, for example, a write command includes a data portion for a multi-word cell having a same number of words as the physical memory units. In this embodiment, storing the multi-word cell occurs over multiple write cycles (e.g., one word stored per cycle) and the individual words are distributed over the physical memory units by a memory rotator 123, described below.

In an embodiment, the plurality of memory units are configured so that an individual memory access token provides write access to only one physical memory unit of the multiple physical memory units (i.e., via the logical memory unit) while the remaining physical memory units are available to the members of the token group. In this embodiment, the logical memory unit is configured to process simultaneous write commands from up to a same number of groups of ingress interfaces (e.g., token groups) as it has physical memory units. In the embodiments shown in FIG. 1 and FIG. 5, for example, the logical memory unit A comprises a multiple of four physical memory units P1, P2, P3, and P4 so that up to four simultaneous write commands can be processed by the logical memory unit A, in an embodiment. The four simultaneous write commands correspond to four separate instances of the memory access token A of four different pools of memory access tokens (e.g., four pools 122-1, 122-2, 122-3, and 122-4 shown in FIG. 4, each containing one instance of the memory access token A), in an embodiment. In other words, the plurality of memory units 121 support four token groups via their corresponding pools of memory access tokens, write command collisions between members of a token group are prevented by the assignment of tokens, and write command collisions between the "token holders" of the token groups are prevented by processing the write commands via different physical memory units of the logical memory unit. In an embodiment, when a cell has one word in each physical memory, then the cell is written in 4 consecutive write cycles by a single port in a single token group. The rotator 123 rotates a connection between the single token group and the physical memory by 1 every write cycle, such that one word is written to each physical memory during the 4 write cycles.

The network device 100 further includes one or more packet processors 140 and one or more queue managers 170 that process one or more portions of a received packet or other suitable data structure representing the packet, in an embodiment. In an embodiment, the network device 100 includes a single packet processor 140 and a single queue manager 170 that process portions of received packets for all of the ports of the network device 100. In another embodiment (e.g., as shown in FIG. 1), the network device 100 includes one packet processor 140 for each token group and a single queue manager 170 for all of the ports of the network device 100. In other embodiments, a packet processor 140 processes packets for one or more ports, port groups, and/or token groups. In some embodiments, a queue manager 170 processes packets for one or more ports and/or port groups.

A received packet 150 generally includes a header 151 and a payload 152. In an embodiment, the packet processor 140 identifies an egress interface from which the received packet 150 is to be transmitted and provides an indication of the identified egress interface to the queue manager 170. In an embodiment, the packet processor 140 extracts packet headers from a packet and generates descriptors 155. In an embodiment, the descriptors are data units that represent corresponding packets and are used for processing. The descriptors are separate from the corresponding packets and typically contain header information extracted from corresponding packets as well as other information characterizing the corresponding packets. Packet processor 140 includes one or more modules for processing the generated descriptors 155 to perform various operations, in some embodiments. Generally, the packet processor 140 (e.g., including a bridging engine, in an embodiment) processes descriptors 155, and accesses various routing, forwarding and/or other suitable databases stored in a lookup memory (not shown), to perform forwarding operations for the corresponding packets.

Packet processor 140 includes one or more tangible/physical processor engines for processing packets. In a first illustrated embodiment seen in FIG. 1, a single packet processor 140 is seen. In an embodiment, packet processor 140 includes one or more processor engines configured in an ASIC pipeline configuration, in which engine performs one or more predetermined processing operations according to an order of operation. In another embodiment, packet processor 140 includes at least some engines configured to read and execute software or firmware instructions stored on a tangible, non-transitory, computer-readable memory (e.g., RAM, read-only memory (ROM), FLASH memory, etc.). In still another embodiment, a plurality of packet processor engines is configured to execute instructions to perform packet processing operations based on a processing context. In some embodiments, the software or firmware instructions include computer-readable instructions that, when executed by the processor(s), cause the processor(s) to perform any of the various actions of packet processor 140 described herein. In one such embodiment, various components are implemented as respective software or firmware modules, with each module corresponding to instructions executed by packet processor 140. It is noted that visual arrangement of various components shown in FIG. 1 corresponds only to a logical order of operation rather than a physical location of the corresponding component.

After being processed by the packet processor 140, each descriptor 155, or a data unit representative of the descriptor, is sent to the queue manager 170 to be scheduled for transmission, in an embodiment. The queue manager 170 maintains one or more egress queues (not shown in FIG. 1) that correspond to egress ports, packet flows and/or other suitable targets, and buffers descriptors 155 for the packets that are to be provided to the respective egress port, in an embodiment. In some embodiments, the queue manager 170 schedules the corresponding packets for transmission via the appropriate egress ports. In one such embodiment, packets are transmitted, in the scheduled order, by sending the queued descriptors 155 to respective egress ports associated with the queues. In various embodiments, the queues contain descriptors 155 having pointers to the plurality of memory units 121. In some embodiments, the queue manager 170 sends queued descriptors 155 to a transmit direct memory access device (not shown) generally configured to retrieve/read the packets stored in the plurality of memory units 121 and to provide the retrieved packets to a corresponding egress port of network device 100.

The network device 100 is implemented using one or more integrate circuits (ICs) configured to operate as discussed below. For example, the ports 103, 105, 107, 109, 113, 115, 117, and 119, the memory units 121, the memory controller 125, the packet processor 140, and/or the queue manager 170 may be implemented, at least partially, on separate ICs. As another example, at least a portion of the ports 103, 105, 107, 109, 113, 115, 117, and 119, the memory units 121, the memory controller 125, the packet processor 140, and/or the queue manager 170 may be implemented on a single IC.

Figure 2:
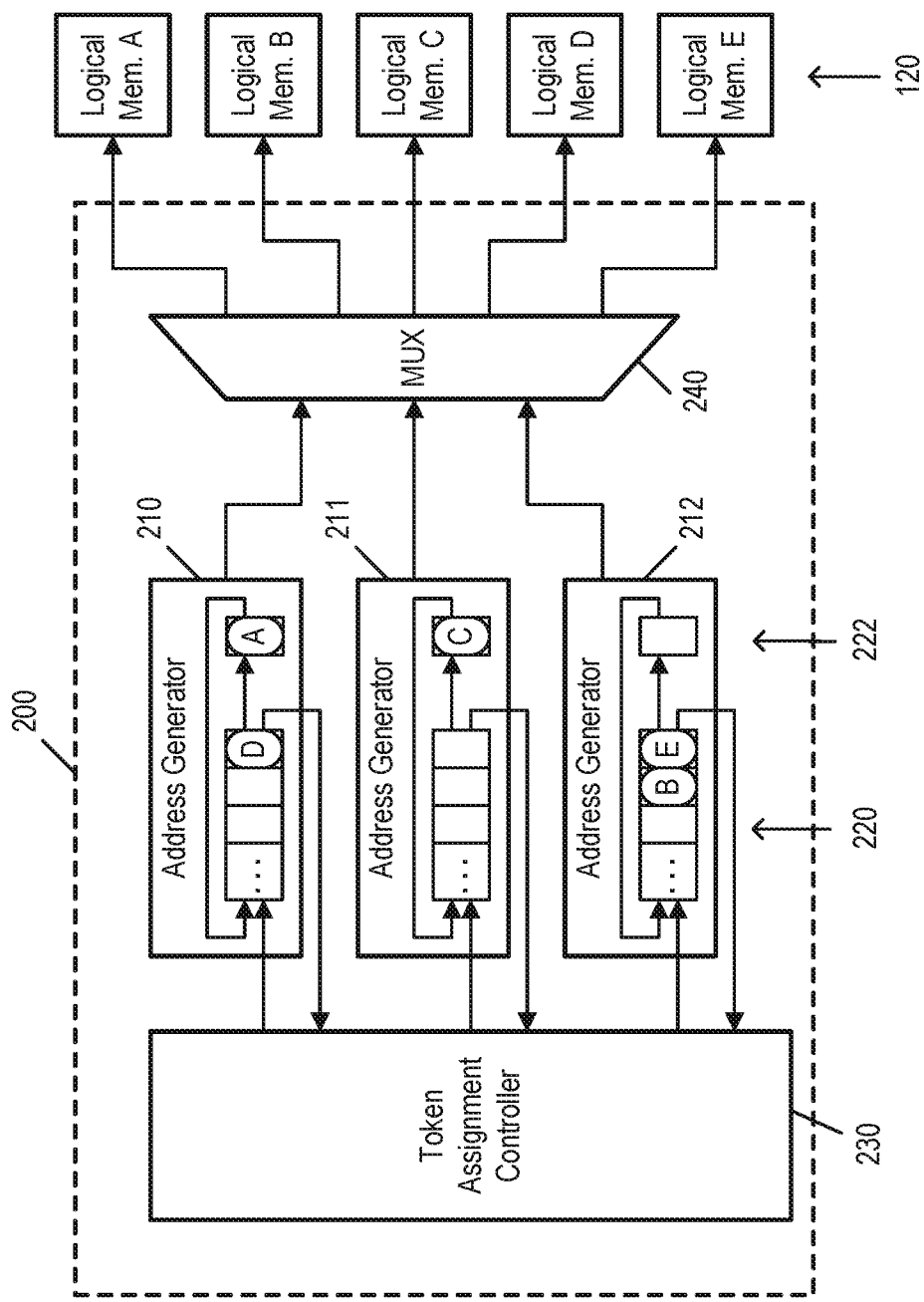
FIG. 2 is a simplified block diagram of an example network device having a memory controller in which network packet storage techniques of the present disclosure are implemented, according to an embodiment.

FIG. 2 is a block diagram of an example memory controller 200 for the network device 100, according to an embodiment. The memory controller 200 corresponds to the token group memory controller 125, in an embodiment. The memory controller 200 is configured to process write commands for packets from two or more ingress interfaces to be stored in the plurality of memory units 121. In an embodiment, the memory controller 200 is configured to process write commands for packets from the port groups 110, 111, and 112 of FIG. 1.

The memory controller 200 includes an address generator for each ingress interface and a token assignment controller 230 that assigns and reassigns memory access tokens among the ingress interfaces, in an embodiment. In the embodiment shown in FIG. 2, the memory controller 200 includes address generators 210, 211, and 212 which correspond to the port groups 110, 111, and 112, respectively. The address generators 210, 211, and 212 are configured to determine a memory address of a reserved memory unit at which to store at least a portion of a packet received at the corresponding ingress interface. The reserved memory unit is identified by a memory access token that has been assigned to the corresponding ingress interface. In an embodiment, the address generators 210, 211, and/or 212 randomly select the reserved memory unit of the plurality of memory units 121 based on their assigned memory access tokens. In some embodiments, the address generators 210, 211, and/or 212 generate non-sequential, random, or pseudo-random memory addresses as the memory address. In an embodiment, the address generators 210, 211, and/or 212 select the address from a list of free addresses for the reserved memory unit. The address generators 210, 211, and/or 212 generate a write command that includes at least a portion of a packet that is received from the corresponding ingress interface and identifies i) the reserved memory unit, and ii) the memory address.

The address generators 210, 211, and 212 include respective token queues 220 that store memory access tokens that have been assigned to the corresponding ingress interface, in an embodiment. The token queue 220 is a first in, first out (FIFO) queue, in an embodiment. In some embodiments, the token queues 220 store or represent an indication of the assigned memory access tokens or other suitable data structure. In other words, an entire token is not necessarily passed between the address generators 210, 211, and 212. In an embodiment, the token assignment controller 230 provides one or more logic control lines that identify which memory access tokens have been assigned, for example, a bitmap of 5 bits corresponding to the respective logical memory units A, B, C, D, and E where a value of "1" indicates that the memory access token for the corresponding logical memory access unit has been assigned to the ingress interface and a value of "0" indicates that the memory access token has not been assigned.

In an embodiment, the address generators 210, 211, and 212 include an active memory slot 222 for protection of a memory access token that is currently in use, for example, during a write cycle of a multi-word cell. In other words, the address generator "locks" a memory access token while a multi-word cell is being stored to the memory unit identified by the memory access token of the active memory slot 222. In the embodiment shown in FIG. 2, the first ingress interface corresponding to address generator 210 is writing to logical memory unit A and the second ingress interface corresponding to address generator 211 is writing to logical memory unit C. In some embodiments, the active memory slot 222 is a front position of the token queue 220 and, after a cell has been stored, the memory access token is placed at a back of the token queue 220.

The token assignment controller 230 assigns and reassigns memory address tokens among the port groups 110, 111, 112 so that each port group is assigned a memory access token for each write cycle, in an embodiment. Additionally, the token assignment controller 230 ensures that each memory access token is assigned to exactly one of the address generators 210, 211, or 212. This ensures that a write command is not delayed due to a missing memory access token. In an embodiment, the token assignment controller 230 reassigns memory address tokens after a predetermined number of cycles, for example, 10 cycles, 20 cycles, or another suitable number. In another embodiment, the token assignment controller 230 reassigns memory address tokens after a predetermined number of write commands, for example, after two, three, or more write commands have been performed. In an embodiment, the token assignment controller 230 reassigns the memory access tokens as often as possible to improve randomness of the memory units for the write commands.

In an embodiment, the network device 100 is configured with more logical memory units than members per token group. In the embodiments of FIG. 1 and FIG. 2, five logical memory units and corresponding memory access tokens for three ingress interfaces provides at least two "floater" or "idle" memory access tokens at any time that can be reassigned. The token assignment controller 230 randomly reassigns an idle memory access token from a first token queue to a second token queue, in an embodiment. In some embodiments, the token assignment controller 230 reassigns a memory access token at the back of the token queue 220 (e.g., a most recently used memory access token). In other embodiments, the token assignment controller 230 reassigns any memory access token that is not at the front of the token queue 220. In the embodiment shown in FIG. 2, memory access tokens D, B, and E are idle and available for reassignment.

In an embodiment, the address generators 210, 211, and 212 generate write commands and provide the write commands to multiplexer 240 of the memory controller 200, in an embodiment. The multiplexer 240 routes the write command to the corresponding logical memory unit, in an embodiment. In some embodiments, the address generators allocate the cell of the reserved memory unit once the memory address has been determined.

In the embodiment shown in FIG. 2, the memory controller 200 includes the address generators 210, 211, and 212, the token assignment controller 230, and the multiplexer 240. In some other embodiments, one or more of the address generators 210, 211, and 212 are located at the corresponding ingress interface. In an embodiment, for example, the address generator 210 is located at the port group 110.

Figure 3:
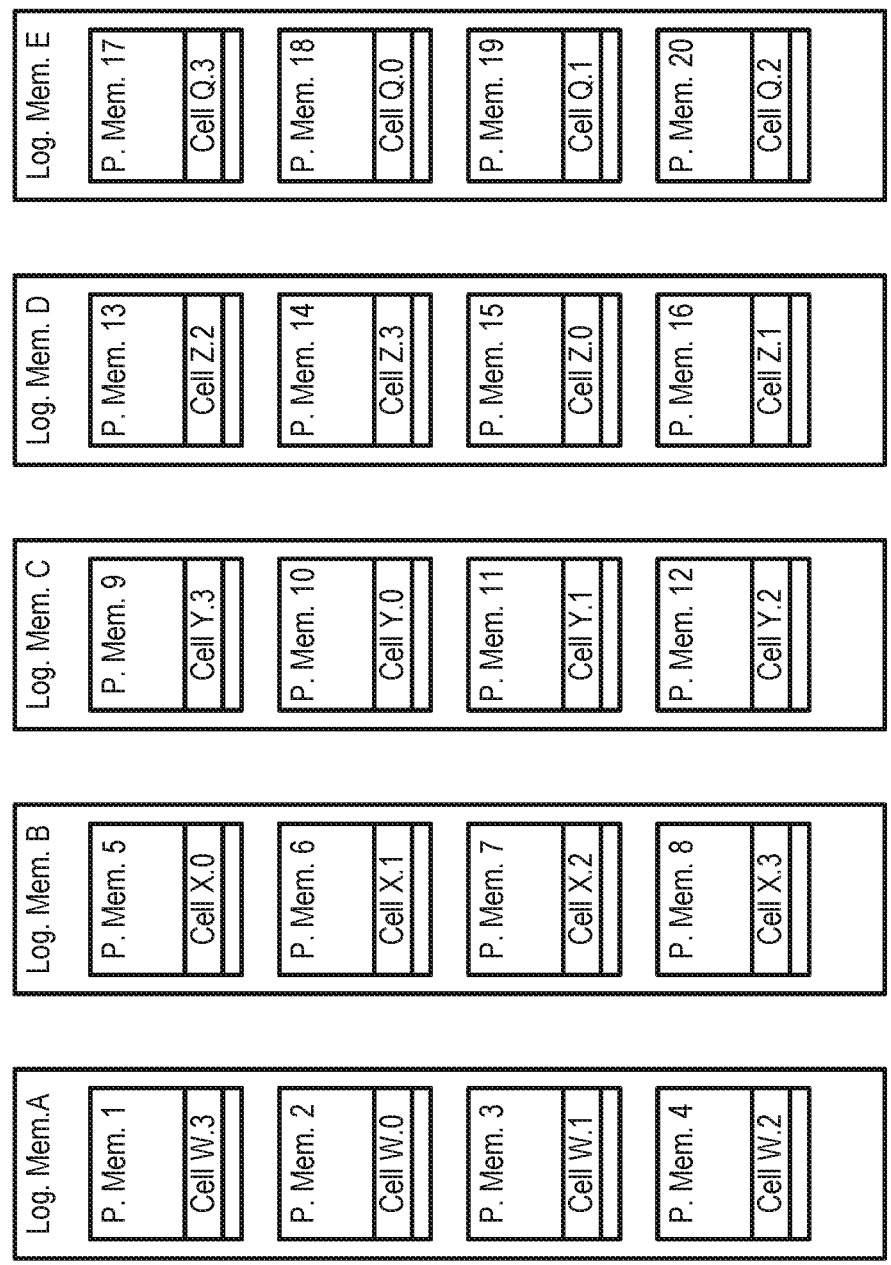
FIG. 3 is a simplified block diagram of example logical memory units of the network device of FIG. 1, according to an embodiment.

FIG. 3 is a block diagram of example logical memory units A, B, C, and D of the network device 100, according to an embodiment. In the embodiment shown in FIG. 3, the plurality of logical memory units A, B, C, D, and E include physical memory units 1 through 20, with four physical memory units per logical memory unit where each of the physical memory units has an independent read/write port. In this embodiment, a cell comprises four words that are stored in a single logical memory unit. In an embodiment, for example, each physical memory unit has a read/write port that is 256 bits wide, a multi-word cell of 1024 bits has one 256 bit word in each physical memory of the logical memory unit, and thus the multi-word cell for a write command is stored over four write cycles. Moreover, each logical memory unit has four independent read/write ports. As shown in FIG. 3, a cell W is stored as separate words W.0, W.1, W.2, and W.3 in logical memory unit A, a cell X is stored as separate words X.0, X.1, X.2, and X.3 in logical memory unit B, and so on. In some embodiments, first words of multi-word cells (e.g., W.0, X.0, Y.0, and Z.0) are stored in different physical memory units of the same logical memory unit, as described below with respect to FIG. 5. Subsequent words of the multi-word cell are stored circularly or in a "round robin" manner across remaining physical memory units of the logical memory unit.

FIG. 4 is another block diagram of the network device 100, according to an embodiment. In the embodiment shown in FIG. 4, the network device 100 includes the plurality of memory units 121 and the token groups 130, 132, 134, and 136 of FIG. 1. The plurality of memory storage units 121 includes logical memory units A, B, C, D, and E, each having four, individually accessible physical memory units as described above with respect to FIG. 3. In this embodiment, each logical memory unit has four read/write ports (e.g., one read/write port per physical memory unit). In this embodiment, each read/write port of a logical memory unit is reserved for a particular token group, for example, a first read/write port is reserved for the token group 130, a second read/write port is reserved for the token group 132, and so on. The memory controller for a token group governs write access to a particular logical memory unit by assigning a memory access token to an ingress port. Further, the memory rotator 123 governs write access to a particular physical memory unit within the particular logical memory unit by rotating the token groups among the physical memory units. In other words, the memory controller prevents memory write collisions between members of a token group and the memory rotator 123 prevents memory write collisions between the token groups.

Figure 5:
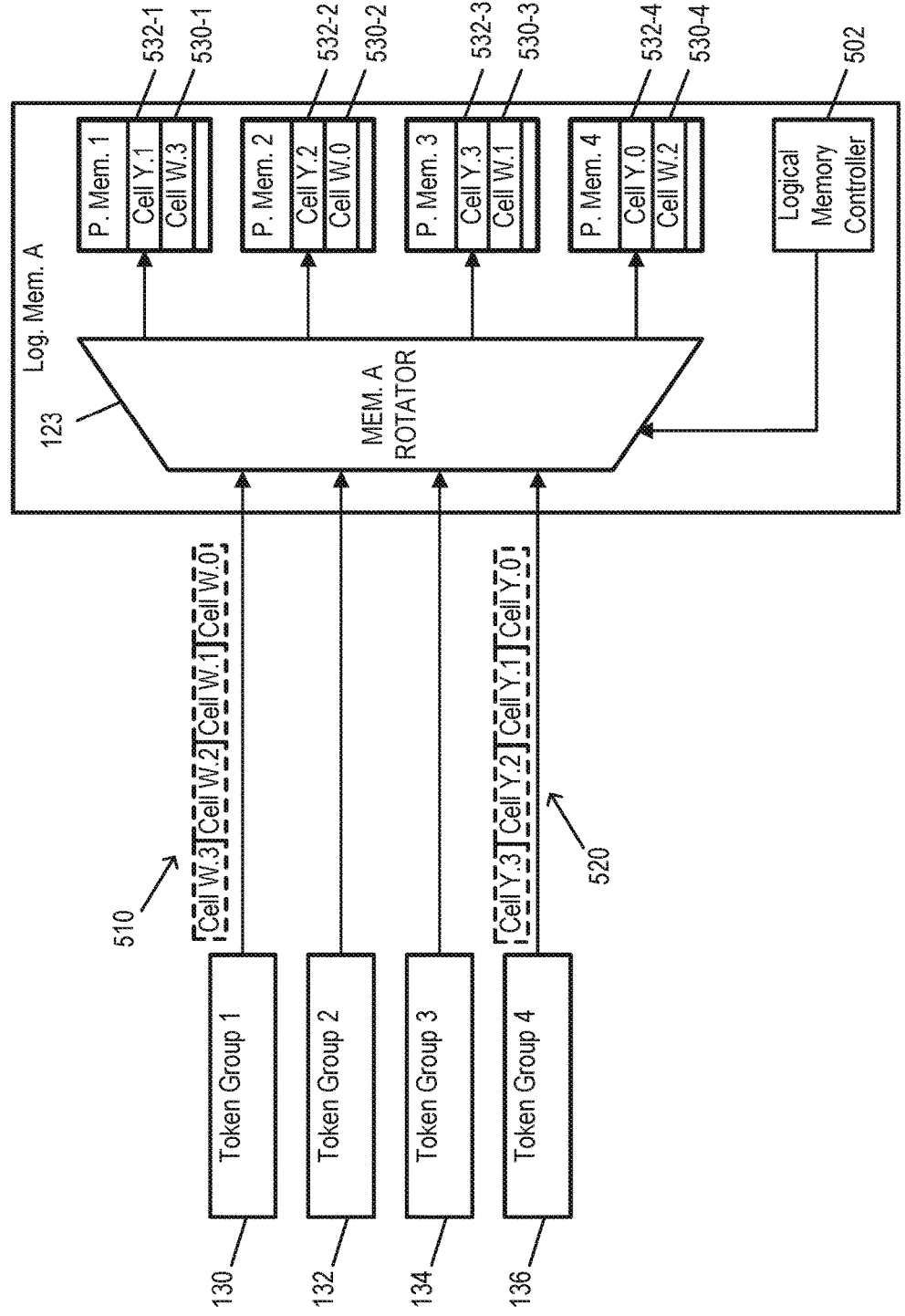
FIG. 5 is a simplified block diagram of an example logical memory unit of FIG. 3, according to an embodiment.

FIG. 5 is a block diagram of the logical memory unit A of FIG. 4, according to an embodiment. The logical memory unit A comprises the memory rotator 123, a logical memory controller 502, and four physical memory units 1, 2, 3, and 4. In this embodiment, each of the physical memory units 1, 2, 3, and 4 has respective a first address location 530 and a respective second address location 532 at which a word can be stored, for example, first address location 530-1 of physical memory unit 1, first address location 530-2 of physical memory unit 2, etc. While only two address locations are shown for clarity, the physical memory units contain many address locations, in various embodiments. In an embodiment, for example, the physical memory units have a storage capacity of 512 Megabits ($2^{29}$ bits) with a 256 bit word size ($2^8$ bits) and thus contain 2,097,152 ($2^{21}$) address locations. In this embodiment, the four physical memory units 1 through 4 each store a 256 bit word of a 1024 bit multi-word cell.

The physical memory units 1, 2, 3, and 4 are configured as a circular buffer and the memory rotator 123 is configured to "rotate" among the physical memory units of the logical memory unit A, in an embodiment. In other words, the memory rotator 123 stores first, second, third, and fourth words of a multi-word cell to physical memories 1, 2, 3, and 4, respectively, in one scenario, and stores the first, second, third, and fourth words to physical memories 3, 4, 1, and 2, respectively, in another scenario, etc. In an embodiment, the logical memory controller 502 controls the ordering of the physical memory units for the multi-word cell by selecting a physical memory unit for the first word and storing an indication of which physical memory unit contains the first word. When performing a read command for the multi-word cell, the logical memory controller 502 controls the memory rotator 123 to begin reading from the indicated physical memory unit containing the first word. In various embodiments, the indication is a bit pattern that identifies the physical memory unit, for example, a bit pattern of two bits can indicate up to four physical memory units (00, 01, 10, and 11), a bit pattern of three bits can indicate up to eight physical memory units, and so on. In an embodiment, the logical memory controller 502 randomly or pseudo-randomly selects the physical memory unit for the first word. In another embodiment, the logical memory controller 502 selects the physical memory unit based on the token group or ingress interface from which the write command was received (e.g., token group 130 starts at physical memory unit 1, token group 132 starts at physical memory unit 2).

In the embodiments shown in FIGS. 4 and 5, simultaneous write commands 510 and 520 are received by the logical memory unit A and the portions of received packets of the write commands are stored as respective multi-word cells that span the physical memory units 1 through 4. Each word of a multi-word cell is stored to a different physical memory unit of the logical memory unit. As shown in FIG. 5, the token group 130 provides the write command 510 for a cell W to be stored in the first address location 530. In an embodiment, the memory rotator 123 divides the multi-word cell W into four individual words (W.0, W.1, W.2, and W.3) and writes each word to a different physical memory unit. The token group 136 provides the write command 520 for a cell Y to be stored in the second address location 532. In an embodiment, the memory rotator 123 divides the multi-word cell Y into four individual words (Y.0, Y.1, Y.2, and Y.3) and writes each word to a different physical memory unit.

The memory rotator 123 stores each word of a multi-word cell during a single write cycle, and thus each multi-word cell is stored over a period of four consecutive write cycles, in an embodiment. For each write command, the memory rotator 123 utilizes only one physical memory unit during a write cycle, and thus the memory rotator 123 is configured to process four separate write commands (e.g., from different token groups) per write cycle by directing the words of different write commands in a same write cycle to different physical memory units.

In the embodiment shown in FIG. 5, the memory rotator 123 stores word W.0 at the first memory address location 530-2 of the physical memory 2 and simultaneously stores word Y.0 at the second memory address location 532-4 of the physical memory 4 during a first write cycle. In a second, subsequent write cycle, the memory rotator 123 stores word W.1 at the first memory address location 530-3 of the physical memory 3 and simultaneously stores word Y.1 at the second memory address location 532-1 of the physical memory 1. In a third write cycle, the memory rotator 123 stores word W.2 at the first memory address location 530-4 of the physical memory 4 and simultaneously stores word Y.2 at the second memory address location 532-2 of the physical memory 2. In a fourth write cycle, the memory rotator 123 stores word W.3 at the first memory address location 530-1 of the physical memory 1 and simultaneously stores word Y.3 at the second memory address location 532-3 of the physical memory 3. In other embodiments, the memory rotator 123 stores multi-word cells from one, three, or four simultaneous write commands from the token groups 130, 132, 134, and/or 136. In other embodiments, the logical memory unit A includes a different number of physical memory units, for example, eight physical memory units, and thus the memory rotator 123 is configured to simulta-neously store up to eight multi-word cells over eight write cycles, each multi-word cell having eight words that span the eight physical memory units.

The logical memory units of the network device 100 receive read commands for cells from egress ports (e.g., ports 113, 115, 116, 119) of the network device 100, in various embodiments. In an embodiment, the egress ports are not members of a token group and the read commands are processed by each physical memory unit in cycles that are not used by write commands. Where the read commands are processed between write commands, a data response to a read command has a random (e.g., statistical) delay. In this embodiment, a delay of the egress port while waiting for a logical memory unit to process the read command is unbounded because the logical memory unit may be continuously written to by an ingress port. When a packet spans multiple cells of different logical data units, the data responses are provided out of order, in some scenarios, based on whether a logical data unit is being written to by an ingress interface.

In an embodiment, each memory access token of a pool of memory access tokens corresponds to a set of logical memory units, for example, a set of two, three, or more logical memory units. In this embodiment, an ingress interface writes to only one logical memory unit of the set of logical memory units, and thus the remaining logical memory units of the set are idle and can perform read commands. In an embodiment, the ingress interface alternates among the logical memory units of the set of logical memory units for write commands and improved performance of read operations on the remaining logical memory units is obtained.

In some scenarios, a packet or a portion thereof that corresponds to a write command does not fill an entire cell. As an example, where the cell includes four 256 bit words, a 750 bit packet fills three words of a four word cell because the first three words provide 768 bits of storage, leaving a remainder fourth word and remainder fourth cycle. As another example, where the cell includes four 256 bit words totaling 1024 bits, a 2400 bit packet occupies two full cells (2×1024 bits) and 352 bits of the packet occupy two words of a third cell, leaving remainder third and fourth words and remainder third and fourth cycles. In an embodiment, the logical memory units are configured to perform read commands during remainder cycles. In some scenarios, performing read commands during the remainder cycles prioritizes write access over read access, which reduces the likelihood of congestion of incoming packets since they will not be delayed by a read access.

Figure 6:
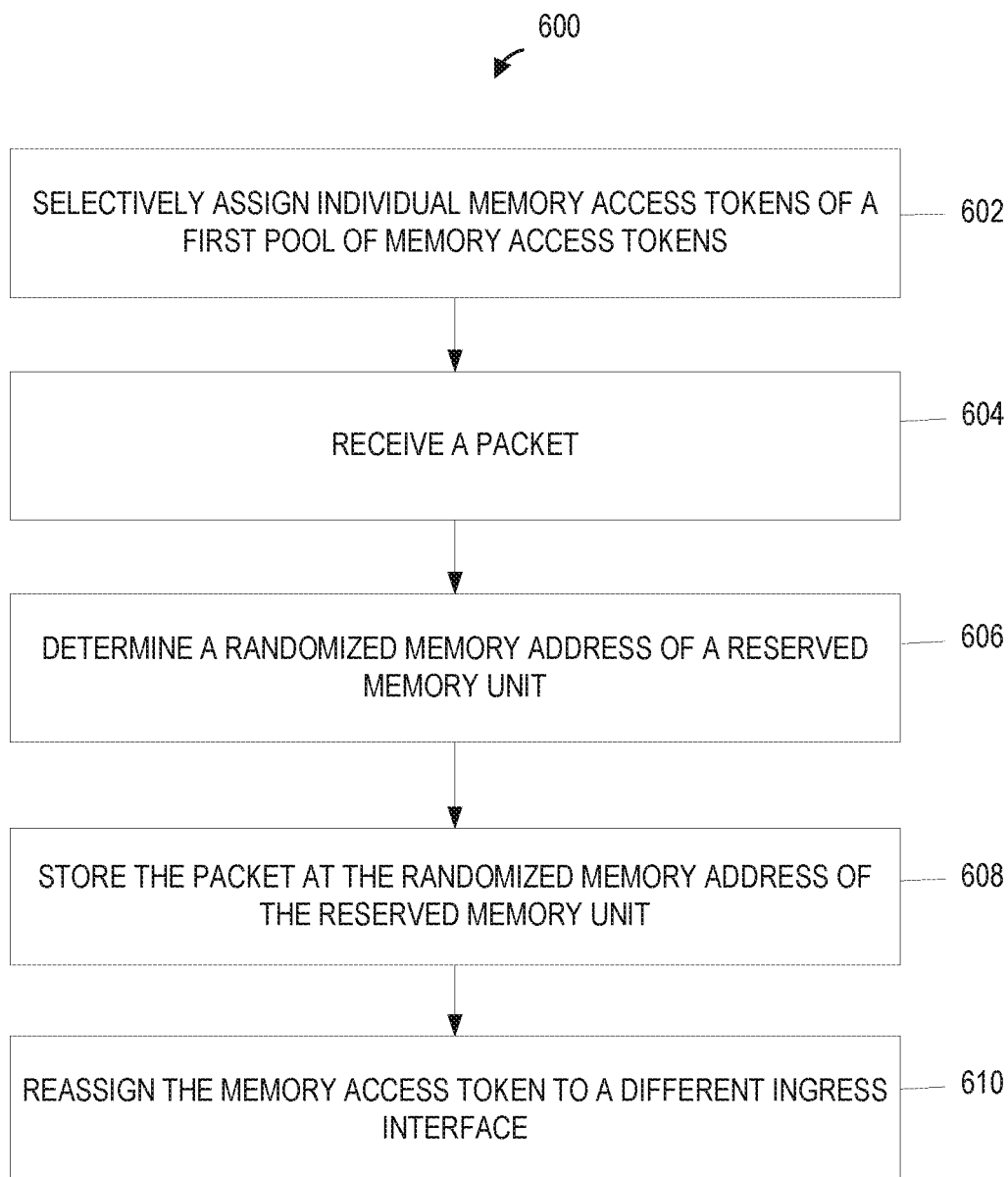
FIG. 6 is a flow diagram illustrating an example method, implemented in the network device of FIG. 1, of storing packets received at a plurality of ingress interfaces, according to an embodiment.

FIG. 6 is a flow diagram illustrating an example method 600 for storing packets received at a plurality of ingress interfaces of a network device while data corresponding to the packets is processed by a packet processor at least to determine an egress interface of the network device through which to transmit the packets, according to an embodiment. In an embodiment, the method 600 is implemented by the network device 100, according to an embodiment. With reference to FIG. 1, the method 600 is implemented by the memory controller 200, in an embodiment.

At block 602, individual memory access tokens of a first pool of memory access tokens are selectively assigned to ones of the plurality of ingress interfaces to govern write access to the plurality of memory units, in an embodiment. Ingress interfaces among the plurality of ingress interfaces are respectively assigned at least one memory access token and write packets to memory units of the plurality of memory units identified by the corresponding assigned one or more memory access tokens. In the embodiment shown in FIG. 2, for example, the memory controller 200 assigns memory access tokens A and D to a first ingress interface (port group 110) corresponding to address generator 210, assigns memory access token C to a second ingress interface (port group 111) corresponding to address generator 211, and assigns memory access tokens B and E to a third ingress interface (port group 112) corresponding to address generator 212. In an embodiment, the memory units are reserved for the holders of the corresponding memory access tokens.

At block 604, a packet is received at a first ingress interface of the plurality of ingress interfaces, in an embodiment.

At block 606, a memory address of a reserved memory unit of the plurality of memory units at which to store the packet is determined, in an embodiment. The reserved memory unit is identified by a memory access token assigned to the ingress interface. In an embodiment, for example, the address generator 210 selects the memory access token A from among the assigned memory access tokens A and D, and determines a memory address of the corresponding logical memory unit A, as described above with respect to FIG. 2.

At block 608, the packet or a portion thereof is stored at the memory address of the reserved memory unit, in an embodiment. In an embodiment, for example, the memory controller 200 stores the multi-word cell W in the logical memory unit A, as described above with respect to FIG. 5.

At block 610, the memory access token is reassigned to a different ingress interface of the plurality of ingress interfaces after the packet has been stored, in an embodiment. For example, the token assignment controller 230 reassigns the memory access token A to the second ingress interface corresponding to address generator 211.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:
a plurality of ingress interfaces;
a plurality of memory units configured to store packets received at the plurality of ingress interfaces while data corresponding to the packets is processed by a packet processor at least to determine an egress interface of the network device through which to transmit the packets;
a first pool of memory access tokens, ones of the first pool of memory access tokens corresponding to respective memory units of the plurality of memory units and ones of the access tokens being distinct within the first pool; and
one or more integrated circuits that implement a memory controller, configured to:
selectively assign individual memory access tokens of the first pool to ones of the plurality of ingress interfaces to govern write access to the plurality of memory units, including assigning a first memory access token to a first ingress interface of the plurality of ingress interfaces, wherein ingress interfaces among the plurality of ingress interfaces are respectively assigned at least one memory access token and write packets to memory units of the plurality of memory units identified by the corresponding assigned one or more memory access tokens,
receive a packet at the first ingress interface,
determine a memory address of a reserved memory unit of the plurality of memory units at which to store at least a portion of the received packet, wherein the reserved memory unit is identified by the first memory access token and is reserved for write commands by ingress interfaces to which the first memory access token is assigned, and
reassign the first memory access token of the first pool from the first ingress interface of the plurality of ingress interfaces to a second ingress interface of the plurality of ingress interfaces between consecutive write commands from the first ingress interface based on a write access scheme to access non-sequential memory units.

2. The network device of claim 1, wherein the one or more integrated circuits are configured to:
reserve the reserved memory unit of the plurality of memory units; and
generate a write command that includes at least a portion of the received packet and identifies i) the reserved memory unit, and ii) the memory address.

3. The network device of claim 1, wherein:
the plurality of ingress interfaces include multiple groups of ingress interfaces, ones of the multiple groups corresponding to respective pools of memory access tokens, ones of the pools of memory access tokens corresponding to respective memory units of the plurality of memory units and being distinct within the corresponding pool; and
the memory controller is further configured to reassign memory access tokens of a pool of memory access tokens only among ingress interfaces of the corresponding group of ingress interfaces.

4. The network device of claim 3, wherein each memory unit of the plurality of memory units is configured for simultaneous write access by ingress interfaces to which the corresponding memory access token of the corresponding pool of memory access tokens has been assigned.

5. The network device of claim 4, wherein:
a respective memory unit among the plurality of memory units is a logical memory unit that is accessed by ingress interfaces as a single memory unit;
the respective logical memory unit comprises plural physical memory units that are each independently accessible.

6. The network device of claim 5, wherein:
- each memory access token within each of the respective pools of memory access tokens corresponds to a logical memory unit of the plurality of logical memory units; and
- wherein each logical memory unit of the plurality of memory units is configured to process simultaneous write commands from up to a same number of groups of ingress interfaces as it has physical memory units.

7. The network device of claim 5, wherein the one or more integrated circuits are configured to store the portions of received packets of simultaneous write commands as respective multi-word cells that span the physical memory units, each word of the multi-word cell being stored to a different physical memory unit of the corresponding logical memory unit.

8. The network device of claim 7, wherein the one or more integrated circuits are configured to store respective first words of multi-word cells of simultaneous write commands in different physical memory units of the corresponding logical memory unit.

9. The network device of claim 2, wherein the first ingress interface is configured to lock the first memory access token from reassignment while a write command to the corresponding memory unit is in progress.

10. The network device of claim 2, wherein the one or more integrated circuits are configured to assign multiple memory access tokens to the first ingress interface and wherein the reserved memory unit of write commands from the first ingress interface is configured to alternate between the assigned memory access tokens.

11. A method for storing packets received at a plurality of ingress interfaces of a network device while data corresponding to the packets is processed by a packet processor at least to determine an egress interface of the network device through which to transmit the packets, the method comprising:
- selectively assigning, by a memory controller of the network device, individual memory access tokens of a first pool of memory access tokens to ones of the plurality of ingress interfaces to govern write access to the plurality of memory units, wherein ingress interfaces among the plurality of ingress interfaces are respectively assigned at least one memory access token and write packets to memory units of the plurality of memory units identified by the corresponding assigned one or more memory access tokens;
- receiving a packet at a first ingress interface of the plurality of ingress interfaces;
- determining a memory address of a reserved memory unit of the plurality of memory units at which to store at least a portion of the packet, wherein the reserved memory unit is identified by a memory access token assigned to the ingress interface;
- storing the portion of the packet at the memory address of the reserved memory unit;
- reassigning, by the memory controller, the memory access token to a different ingress interface of the plurality of ingress interfaces after the portion of the packet has been stored.

12. The method of claim 11, wherein storing the packet comprises generating a write command that includes the portion of the packet and identifies i) the reserved memory unit, and ii) the memory address.

13. The method of claim 12, wherein:
- the plurality of ingress interfaces include multiple groups of ingress interfaces, ones of the multiple groups corresponding to respective pools of memory access tokens, ones of the pools of memory access tokens corresponding to respective memory units of the plurality of memory units and being distinct within the corresponding pool; and
- reassigning the memory access tokens comprises reassigning memory access tokens of the respective pools of memory access tokens only among ingress interfaces of the corresponding group of ingress interfaces.

14. The method of claim 13, comprising simultaneously writing to a memory unit of the plurality of memory units by different ingress interfaces to which a memory access token that corresponds to the memory unit has been assigned.

15. The method of claim 14, wherein:
- each memory unit of the plurality of memory units is a logical memory unit that is accessed by ingress interfaces as a single memory unit; and
- simultaneously writing to the memory unit comprises simultaneously writing, by each of the different ingress interfaces, to a respective, independently accessible physical memory unit of the logical memory unit.

16. The method of claim 15, wherein simultaneously writing to the logical memory unit comprises simultaneously writing commands to a logical memory unit from up to a same number of groups of ingress interfaces as physical memory units of the logical memory unit.

17. The method of claim 15, wherein simultaneously writing to the logical memory unit comprises storing portions of received packets as respective multi-word cells that span the physical memory units, each word of the multi-word cell being stored to a different physical memory unit of the corresponding logical memory unit.

18. The method of claim 17, wherein storing portions of received packets as respective multi-word cells comprises storing respective first words of multi-word cells of simultaneous write commands in different physical memory units of the corresponding logical memory unit.

19. The method of claim 12, further comprising locking, by the first ingress interface, the first memory access token from reassignment while a write command to the corresponding memory unit is in progress.

20. The method of claim 12, wherein:
- the method further comprises assigning multiple memory access tokens to the first ingress interface;
- wherein determining the memory address of the reserved memory unit of the plurality of memory units comprises alternating between different reserved memory units identified by the multiple memory access tokens.

* * * * *